US010316820B2

(12) United States Patent
West

(10) Patent No.: US 10,316,820 B2
(45) Date of Patent: *Jun. 11, 2019

(54) WIND TURBINE SYSTEM

(71) Applicant: Robert R. West, Grand Forks, ND (US)

(72) Inventor: Robert R. West, Grand Forks, ND (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/675,866

(22) Filed: Aug. 14, 2017

(65) Prior Publication Data
US 2018/0010574 A1 Jan. 11, 2018

Related U.S. Application Data

(63) Continuation of application No. 14/598,917, filed on Jan. 16, 2015, now Pat. No. 9,732,727.

(51) Int. Cl.
| F03D 3/00 | (2006.01) |
| F03D 3/02 | (2006.01) |
| F03D 3/04 | (2006.01) |
| F03D 3/06 | (2006.01) |
| F03D 13/20 | (2016.01) |
| F03D 15/10 | (2016.01) |
| F03D 9/25 | (2016.01) |

(52) U.S. Cl.
CPC ............ *F03D 3/005* (2013.01); *F03D 3/02* (2013.01); *F03D 3/049* (2013.01); *F03D 3/0427* (2013.01); *F03D 3/065* (2013.01); *F03D 9/25* (2016.05); *F03D 13/20* (2016.05); *F03D 15/10* (2016.05); *F05B 2240/216* (2013.01); *Y02E 10/74* (2013.01)

(58) Field of Classification Search
CPC .................................. F03D 3/005; F03D 3/02
See application file for complete search history.

(56) References Cited

U.S. PATENT DOCUMENTS

| 4,382,190 A * | 5/1983 | Jacobson | ................. F03D 3/02 290/55 |
| 6,504,260 B1 | 1/2003 | Debleser | |
| 6,808,366 B2 * | 10/2004 | Sikes | ....................... F03D 3/02 416/1 |
| 8,198,747 B2 * | 6/2012 | Kato | ....................... F03D 3/02 290/55 |

(Continued)

OTHER PUBLICATIONS https://web.archive.org/web/*/www.clarkson.edu/honors/research/papers/cipollina-joseph-052010.doc.

*Primary Examiner* — Justin D Seabe
*Assistant Examiner* — Behnoush Haghighian
(74) *Attorney, Agent, or Firm* — Neustel Law Offices

(57) ABSTRACT

A wind turbine system to provide electrical power in areas not connected to the electrical power grid. The wind turbine system includes a frame and a rotatable shaft supported by the frame. A ring and idler gear assembly is coupled to the rotatable shaft. An upper rotor assembly is coupled to the rotatable shaft. The upper rotor assembly is configured to rotate in a first direction and thereby to rotate the rotatable shaft in a first direction. A lower rotor assembly is coupled to the ring and idler gear assembly. The lower rotor assembly is configured to rotate in a second direction which is opposite of the first direction and thereby to rotate the rotatable shaft in the first direction via the ring and idler gear assembly.

18 Claims, 13 Drawing Sheets

(56) References Cited

U.S. PATENT DOCUMENTS

| | | |
|---|---|---|
| 8,613,587 B2 | 12/2013 | Reilly |
| 2004/0096327 A1 | 5/2004 | Appa |
| 2004/0141845 A1 | 7/2004 | Ohlmann |
| 2010/0032954 A1 | 2/2010 | Law |
| 2010/0111697 A1 | 5/2010 | Wood |
| 2011/0298214 A1* | 12/2011 | Thompson ................ F03D 3/02 290/44 |
| 2012/0019006 A1 | 1/2012 | Bitar |
| 2014/0008915 A1* | 1/2014 | Ribarov .................. F03D 1/025 290/55 |
| 2014/0050583 A1* | 2/2014 | Wang ........................ F03D 3/00 416/98 |
| 2014/0364265 A1* | 12/2014 | Bentgen ................ B63H 23/06 475/151 |
| 2016/0003218 A1* | 1/2016 | Huang .................... F03D 3/005 416/197 A |
| 2016/0327022 A1* | 11/2016 | Pupuleku ............. F03B 17/063 |

\* cited by examiner

WIND TURBINE SYSTEM

CROSS REFERENCE TO RELATED APPLICATIONS

The present application is a continuation of U.S. application Ser. No. 14/598,917 filed on Jan. 16, 2015 which issues on Aug. 15, 2017 as U.S. Pat. No. 9,732,727. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to wind turbines and more specifically it relates to a wind turbine system to provide electrical power in areas that are not connected to the electrical power grid.

Description of the Related Art

Any discussion of the related art throughout the specification should in no way be considered as an admission that such related art is widely known or forms part of common general knowledge in the field.

Wind turbines are used to capture wind energy to generate electricity in an environmentally friendly manner. A wind farm can be made from multiple individual wind turbines. Individual wind turbine systems are growing in popularity for businesses and homes in moderate to high-wind regions.

Horizontal-axis wind turbines are mounted to a tower that extends vertically from the ground and has a top portion supporting the horizontal-axis wind turbine. The horizontal-axis wind turbine has rigid sail assemblies that are fixed to a horizontal shaft and coupled to the electric generator. Wind rotates the rigid sail assemblies and the shaft, which in turn rotates the electric generator to produce electricity.

Unfortunately, because of their large size, horizontal-axis wind turbines are unsuitable for large cities, individual homes and densely populated urban areas because they require extensive space for their installation and operation. In urban areas, horizontal-axis wind turbines can be a hazard to air navigation. Horizontal-axis wind turbines are also regarded as being unsightly, generating excessive noise and can cause injuries to migrating birds.

Because of the inherent problems with the related art, there is a need for a new and improved wind turbine system to provide electrical power in areas that are not connected to the electrical power grid.

BRIEF SUMMARY OF THE INVENTION

The invention generally relates to wind turbine systems which provide electrical power in areas that are not connected to the electrical power grid.

The wind turbine system includes a frame and a rotatable shaft supported by the frame. A ring and idler gear assembly is coupled to the rotatable shaft. An upper rotor assembly is coupled to the rotatable shaft. The upper rotor assembly is configured to rotate in a first direction and thereby to rotate the rotatable shaft in a first direction. A lower rotor assembly is coupled to the ring and idler gear assembly. The lower rotor assembly is configured to rotate in a second direction and thereby to rotate the rotatable shaft in the first direction via the ring and idler gear assembly.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
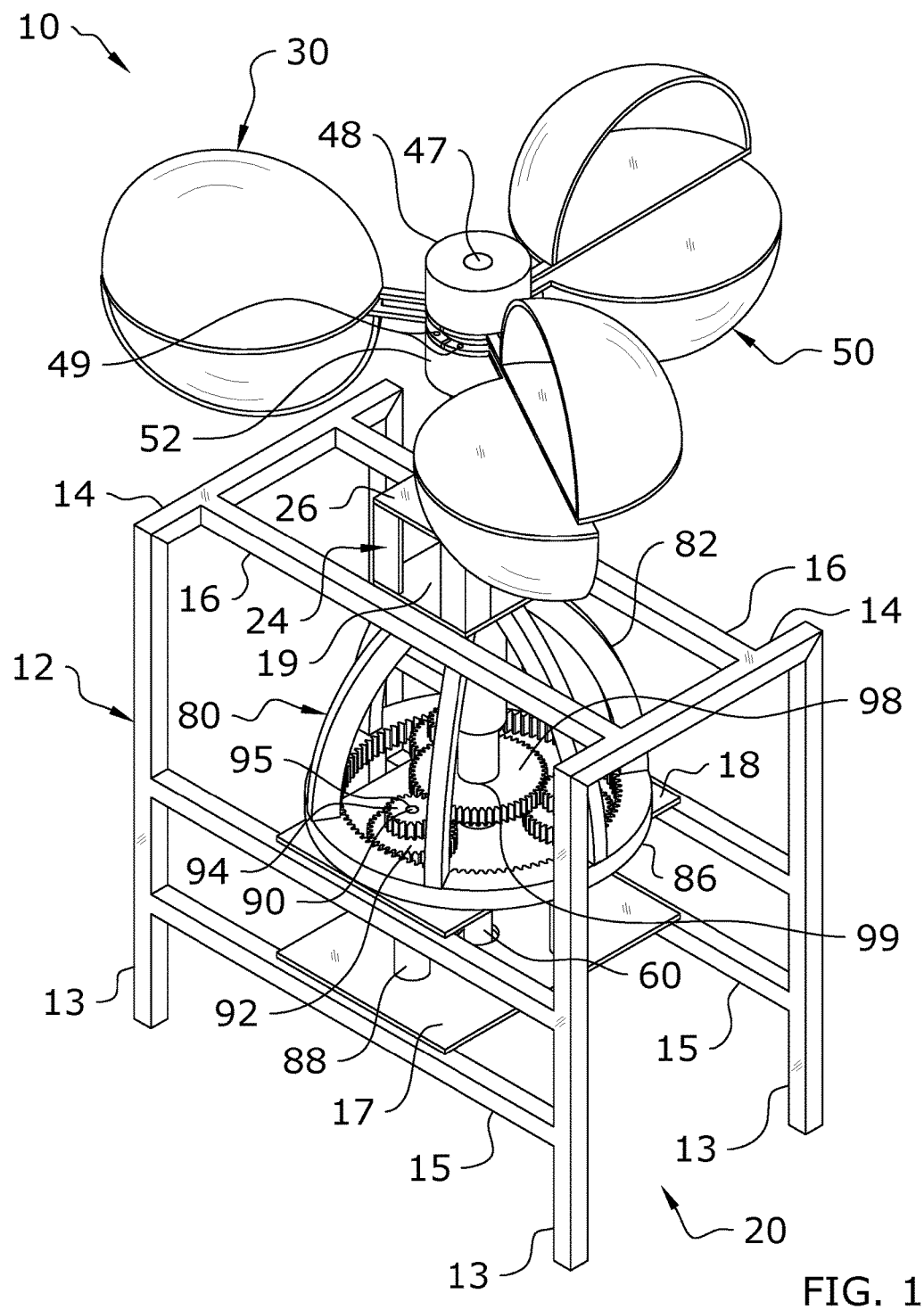
FIG. 1 is an upper perspective view of the wind turbine of the present invention.

A. Overview.

Turning now descriptively to the drawings, in which similar reference characters denote similar elements throughout the several views, FIGS. 1 through 11 illustrate a wind turbine system 10. The wind turbine system 10 is a vertical axis wind turbine. The wind turbine system 10 comprises a frame 12, an upper rotor assembly 30, a lower rotor assembly 50, a rotatable shaft 60 and a ring and idler gear assembly 80. The upper rotor assembly 30 is configured to rotate in a first direction and thereby to rotate the rotatable shaft 60 in a first direction. The lower rotor assembly 50 is configured to rotate in a second direction and thereby to rotate the rotatable shaft 60 in the first direction via the ring and idler gear assembly 80.

B. Frame.

FIGS. 1 through 5 illustrate the frame 12. The frame 12 supports and holds the wind turbine system 10. The frame 12 is generally rectangular in shape. The frame 12 comprises four vertically oriented legs 13. A lower end of the legs 13 can rest on the ground. A horizontal cross-rail 14 is coupled between the upper ends of a pair of legs 13. Four horizontal lower cross members 15 are connected between a central portion of the opposing legs 13. Two horizontal upper cross members 16 are connected between central portions of the cross-rails 14. The frame 12 can be formed from suitable materials such as steel. The frame 12 surrounds an enclosed space 20.

The frame 12 further includes a lower plate 17 that is mounted between and extends across the bottom lower horizontal cross members 15. The middle plate 18 is mounted between and extends across the upper lower horizontal cross members 16. An upper plate 19 is mounted between and extends across the upper horizontal cross members 16. The frame 12 and plates 17, 18 and 19 can be formed from suitable materials such as welded steel.

The frame 12 also has a support bracket 24 that is mounted to the top of the upper horizontal cross-members 16. The support bracket 24 includes four vertically oriented feet 25 that have a bottom end connected to the top of upper plate 19. A top plate 26 is attached to the top end of feet 25.

A bearing 21 is mounted in an aperture in the lower plate 17 and a bearing 22 is mounted in an aperture in the middle plate 18. A bearing 28 is mounted in an aperture in the upper plate 19 and a bearing 29 is mounted in an aperture in the top plate 18.

C. Rotor Assemblies.

Referring to FIGS. 1-6, the wind turbine system 10 has an upper rotor assembly 30 and a lower rotor assembly 50. The upper rotor assembly 30 comprises three rotors 32 that are mounted to an upper hub 48. The lower rotor assembly 50 comprises three rotors 32 that are mounted to a lower hub 52. The upper rotor assembly 30 is configured to rotate in a counter-clockwise direction when wind impinges upon the upper rotor assembly 30. The lower rotor assembly 50 is configured to rotate in a clockwise direction when wind impinges upon the lower rotor assembly 50.

Figure 6:
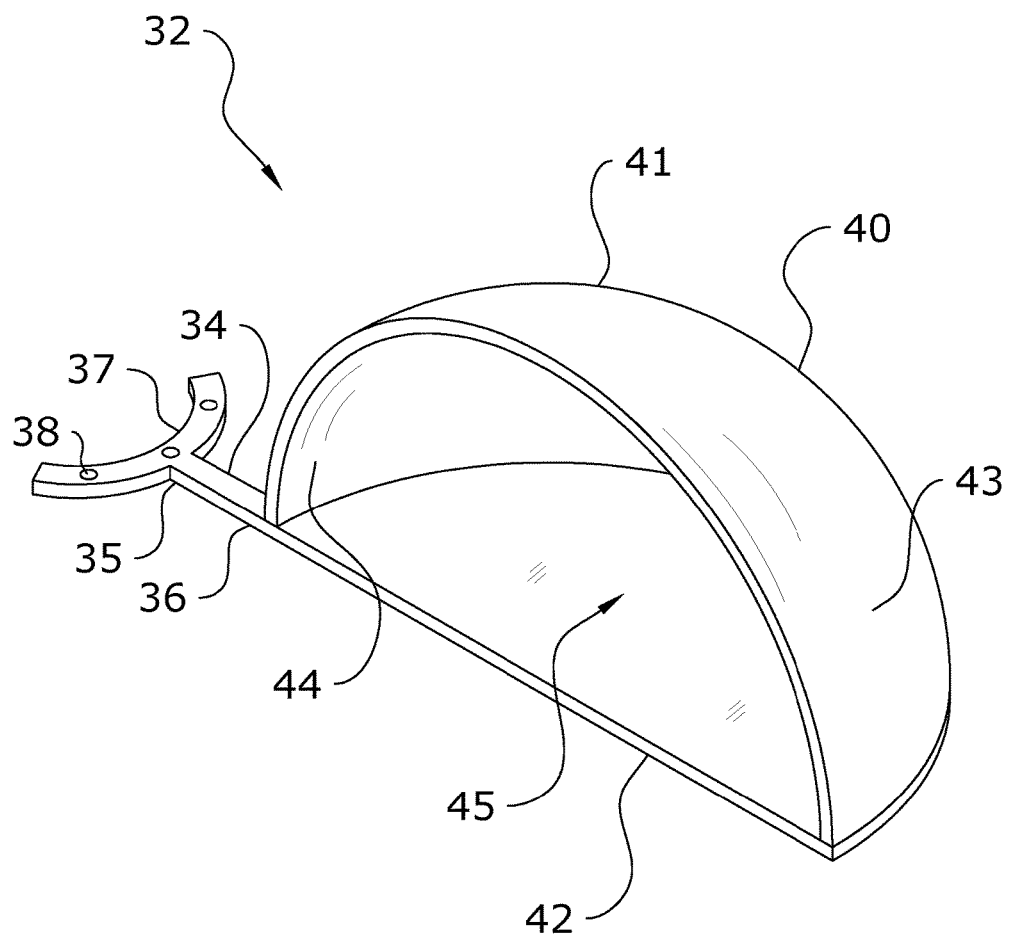
FIG. 6 is an upper perspective view of a rotor of the present invention.
Figure 7:
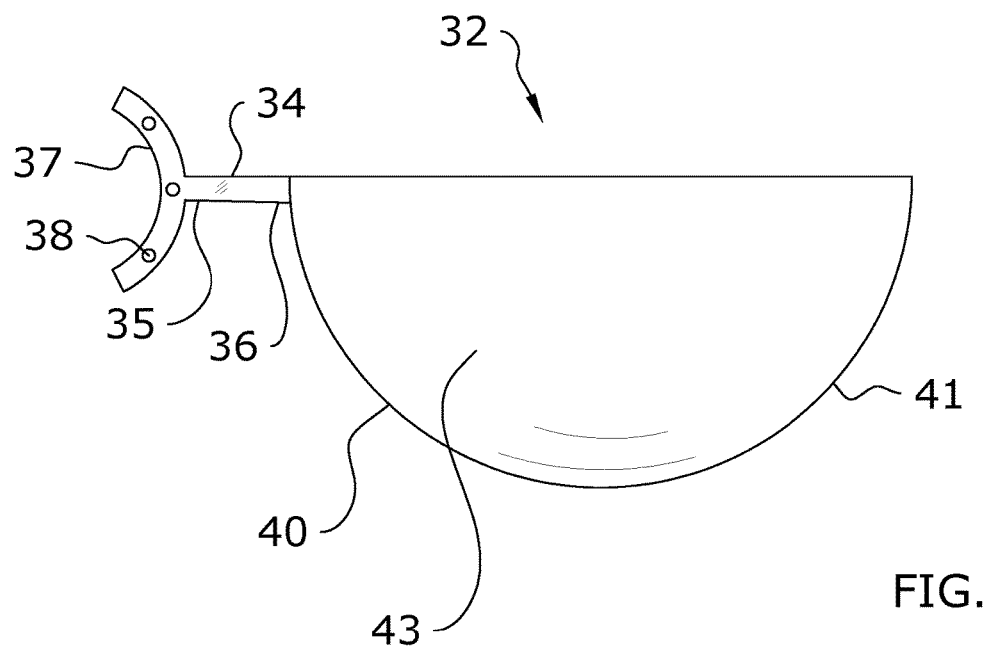
FIG. 7 is a top view of FIG. 6.
Figure 8:
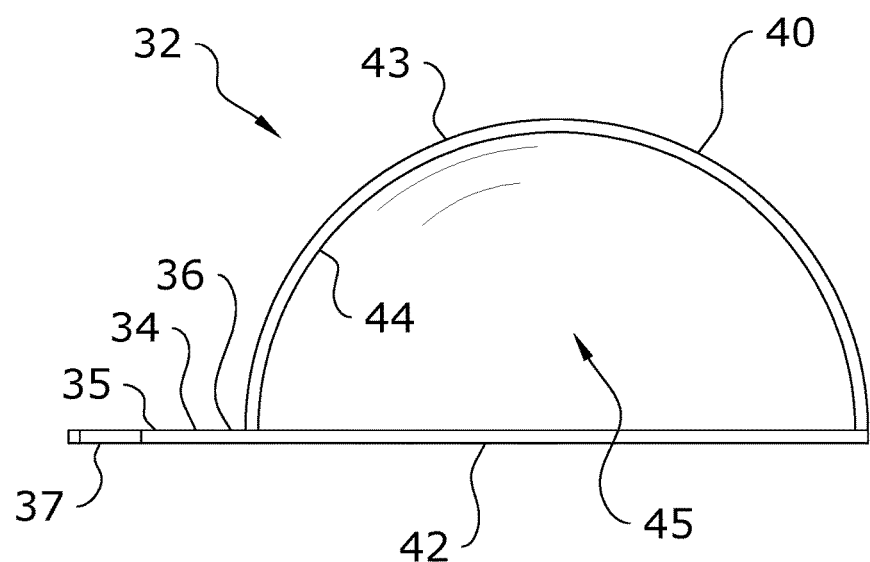
FIG. 8 is a front view of FIG. 6.

With additional reference to FIGS. 6-8, the details of the rotor 32 are shown. The rotor 32 has an arm 34 with a proximal end 35 and a distal end 36. An arc shaped rib 37 is attached to the proximal end 35. Several holes 38 are formed in the rib 37. A rigid sail assembly 40 is attached to the distal end 36 of the arm 34. The rigid sail assembly 40 has a rigid sail 41 that is attached to a planar shaped base 42. The rigid sail 41 is a quarter of a hollow sphere in shape. The rigid sail 41 has an outer surface 43 and an inner surface 44. The rigid sail 41 and the base 42 define a cavity 45.

Three rotors 32 are mounted to the bottom of the upper hub 48 using fasteners 49 that extend through holes 38 and are received in threaded apertures (not shown) in upper hub 48. The rotors 32 are spaced equidistant, 120 degrees apart around the upper hub 48. The upper hub 48 has a bore 47 that extends through the center of the upper hub 48.

Similarly, three rotors 32 are mounted to the top of the lower hub 52 using fasteners 49 that extend through holes 38 and are received in threaded apertures (not shown) in the lower hub 52. The rotors 32 are spaced equidistant, 120 degrees apart around the lower hub 52. The lower hub 52 has a bore 53 that extends through the center of the lower hub 52.

D. Rotatable Shaft.

Figure 2:
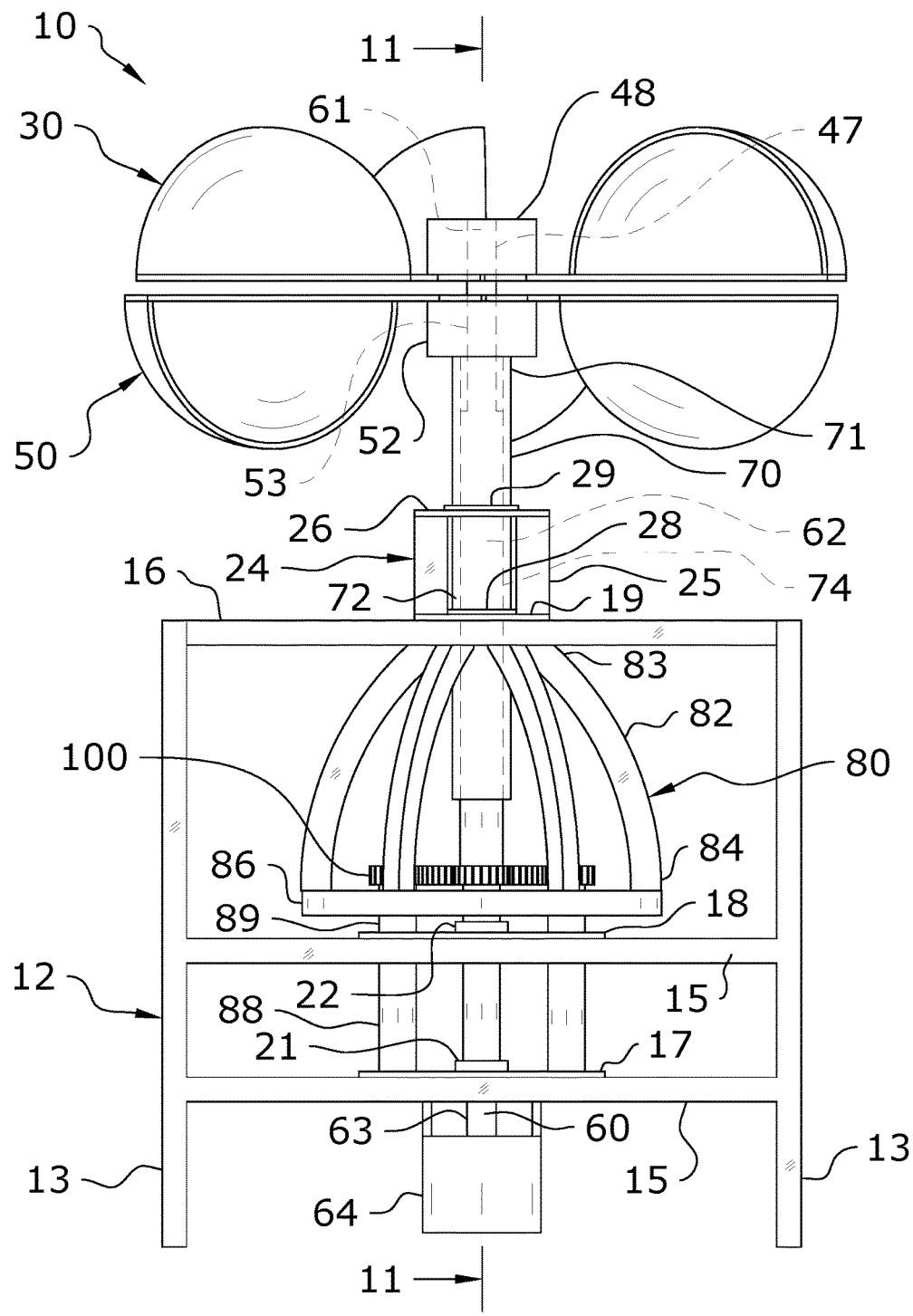
FIG. 2 is a front view of FIG. 1.
Figure 3:
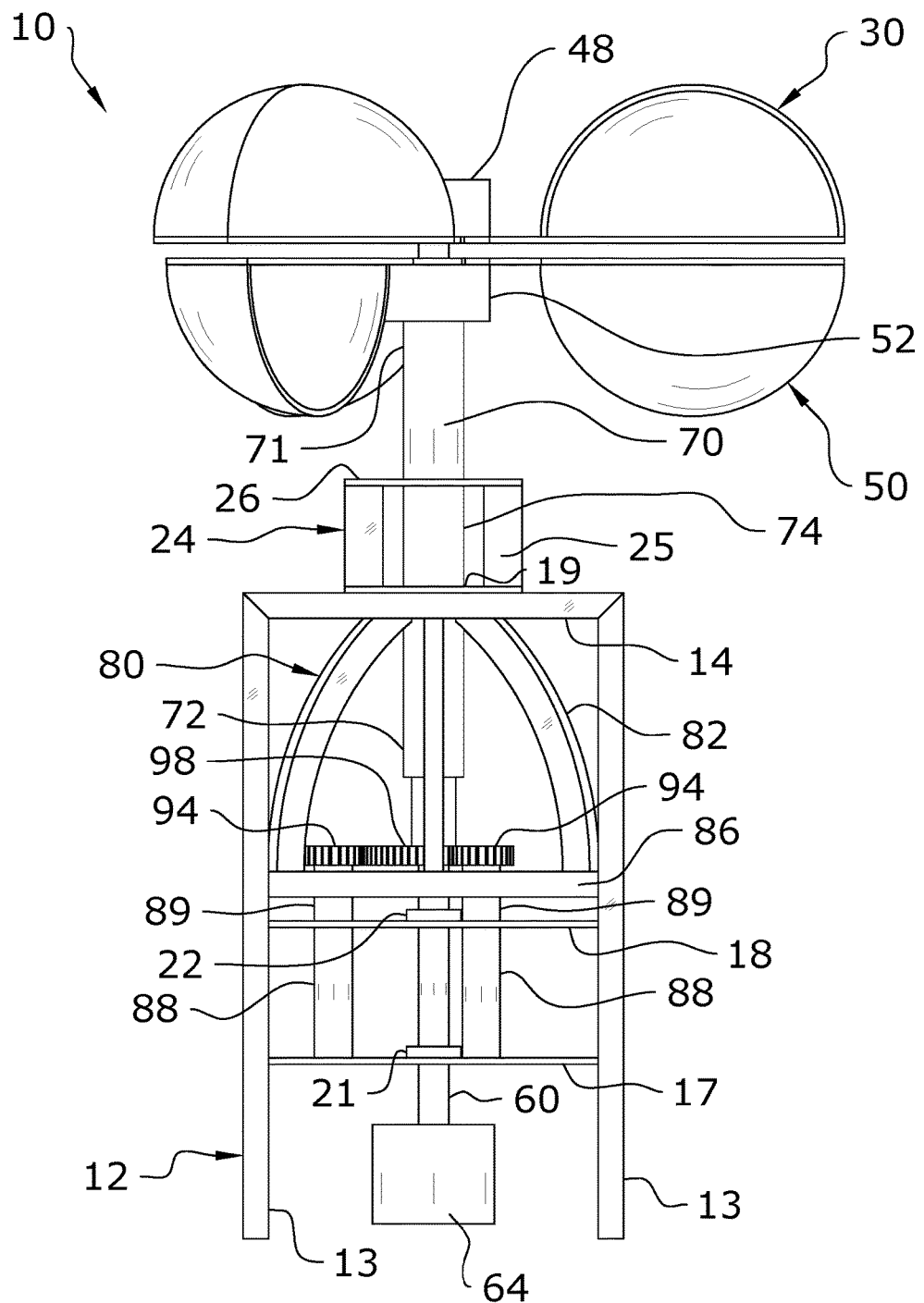
FIG. 3 is a side view of FIG. 1.
Figure 4:
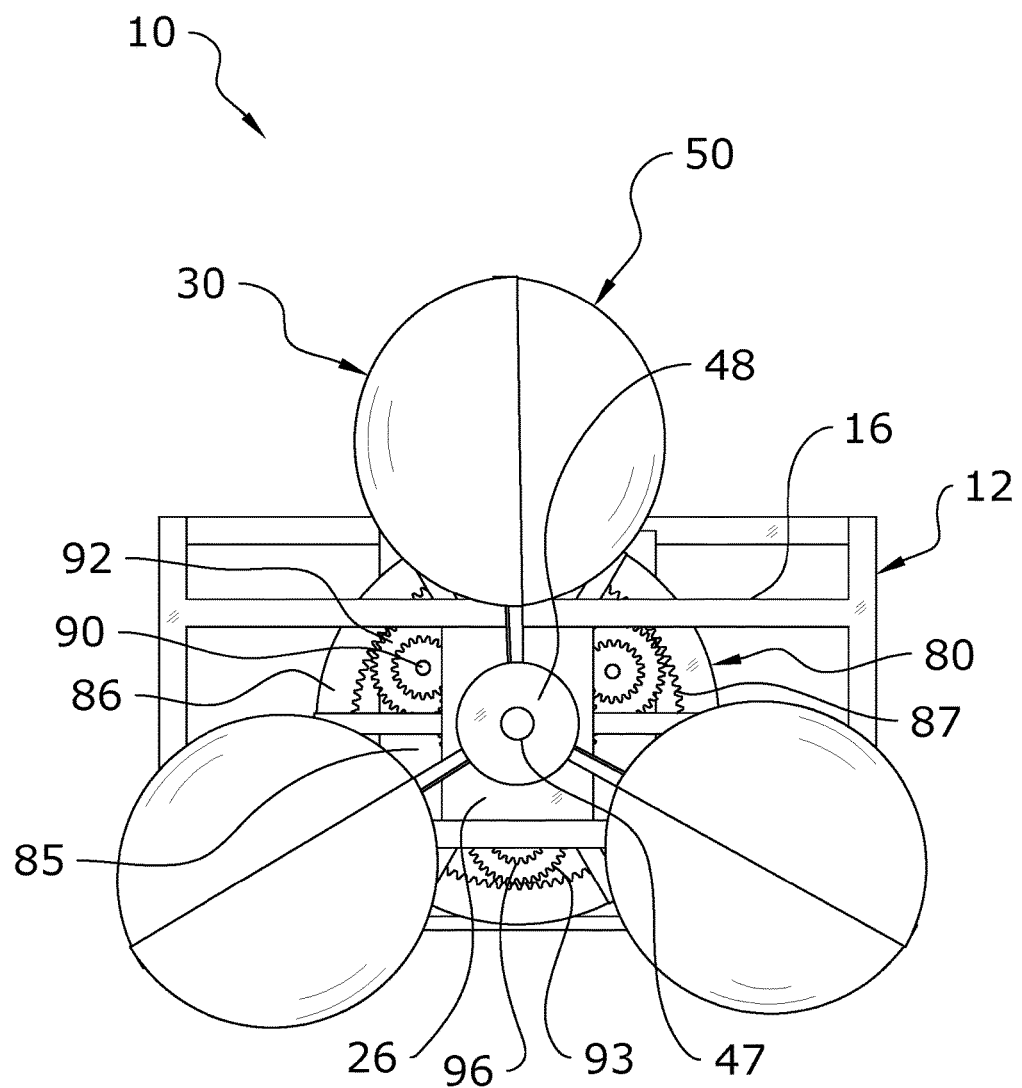
FIG. 4 is a top view of FIG. 1.
Figure 5:
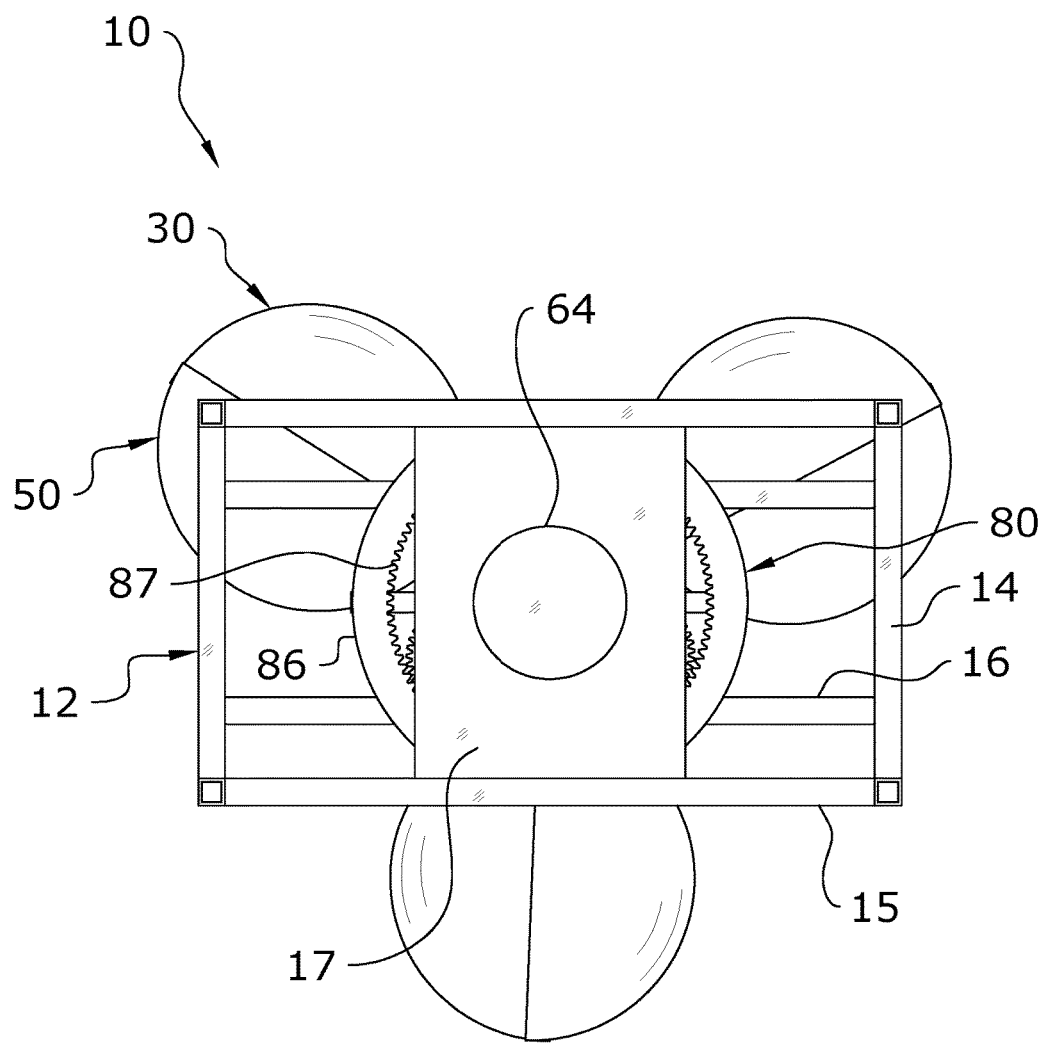
FIG. 5 is a bottom view of FIG. 1.
Figure 11:
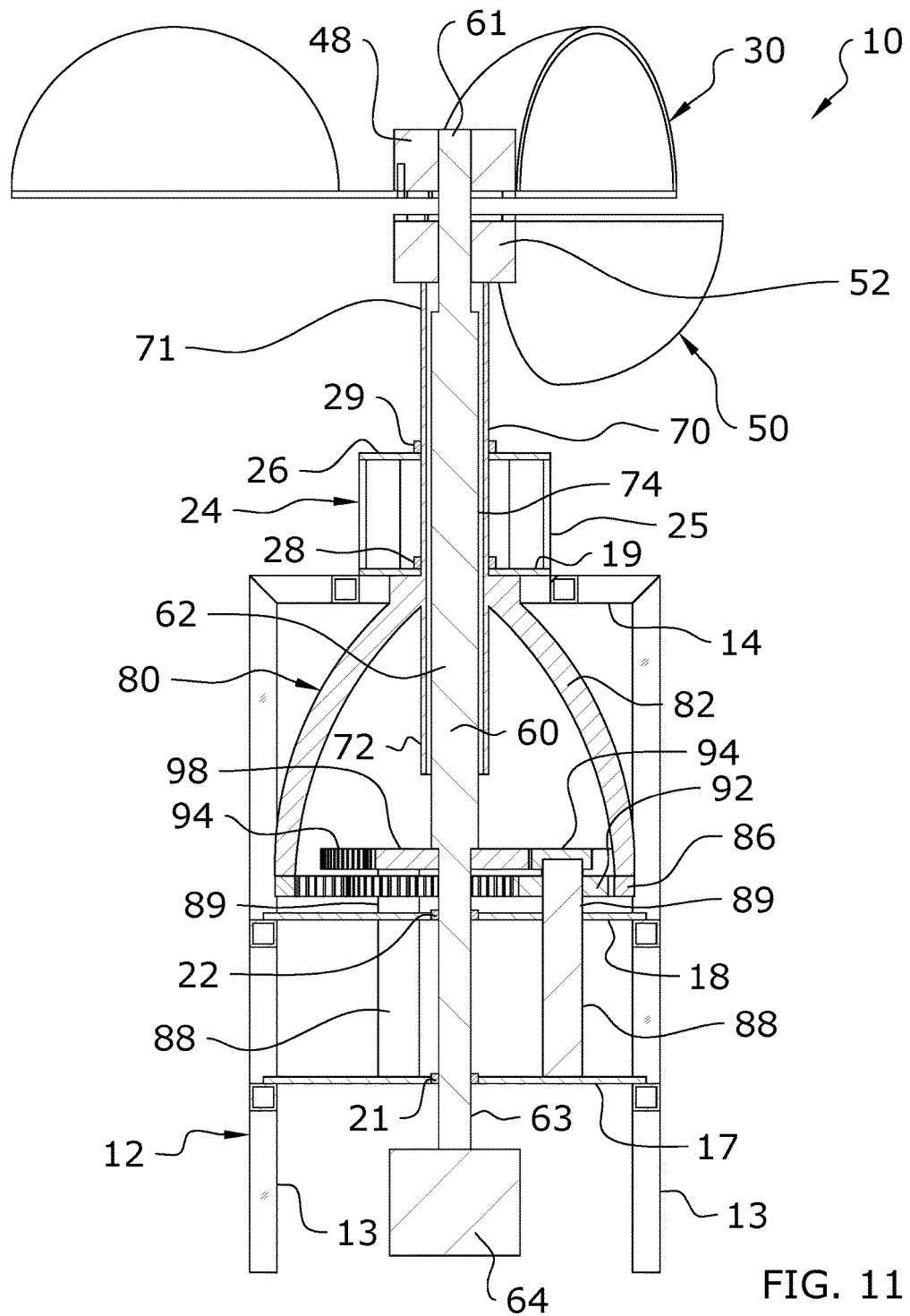
FIG. 11 is a side cross-sectional view of the wind turbine of FIG. 2 taken along section line 11-11.

Referring to FIGS. 2 and 11, the wind turbine system 10 further includes a rotatable shaft 60. The shaft 60 has an upper end 61, a center portion 62 and a bottom end 63. The upper end 61 rests in the bore 47 of the upper hub 48 and is connected to the upper hub 48. The upper end 61 extends through the bore 53 of the lower hub 52 and is connected to the lower hub 52. The shaft 60 is supported for rotation by bearings 21, 22. The shaft 60 extends through, is coupled to and is supported by bearings 21, 22. The bottom end 63 is connected to an electric generator 64. The electric generator 64 is attached to the frame 12. The electric generator 64 generates electricity when the shaft 60 rotates.

A tube 70 has an upper end 71 and a lower end 72. The upper end 71 is connected to the lower hub 52. The tube 70 is supported for rotation by bearings 28, 29. The tube 70 extends through, is coupled to and is supported by bearings 28, 29. The upper end 71 is supported for rotation by the bearing 29 and the lower end 72 is supported for rotation by the bearing 28. A lumen 74 extends through the center of the tube 70. The center portion 62 of the shaft 60 extends through the lumen 74 of the tube 70.

E. Ring and Idler Gear Assembly.

FIGS. 1-6 and 11 illustrate the ring and idler gear assembly 80. The ring and idler gear assembly 80 is mounted to the frame 12. The ring and idler gear assembly 80 has several connecting bars 82 with ends 83, 84. The ends 83 are connected to the lower end 72 of the tube 70. The ends 84 are connected to the ring gear 86. The ring gear 86 has teeth 87 and a central opening 85. The rotation of the tube 70 causes the ring gear 86 to rotate. Three posts 88 are mounted between the lower plate 17 and middle plate 18. Each post 88 has an upper end 89 that extends through the middle plate 18 and terminates in a pin 90.

Three lower idler gears 92 have apertures (not shown) and are mounted over the pins 90 and are engaged with the ring gear 86. The lower idler gears 92 have teeth 93. The lower idler gears 92 rotate about the pins 90. The lower idler gears 88 are arranged within the ring gear 86 such that teeth 93 are engaged with the teeth 87. The three upper idler gears 94 have apertures 95 and are mounted over the pins 90. The upper idler gears 94 have teeth 96. The upper idler gears 94 are attached to the lower idler gears 92 and rotate about the pins 90 in unison. The upper idler gears 94 are engaged with the sun gear 98. The sun gear 98 has a bore 99 and teeth 100. The shaft 60 extends through the bore 99 with the center section 62 attached to the sun gear 98. The upper idler gears 94 are arranged around the sun gear 98 such that teeth 96 are engaged with the teeth 100.

The rotation of the tube 70 in a clockwise direction causes the ring gear 86 to rotate in a clockwise direction. The clockwise rotation of the ring gear 86 drives the lower idler gears 92 and the attached upper idler gears 94 to rotate in a clockwise direction. The lower and upper idler gears rotate about the pins 90 that are mounted to the posts 88. The clockwise rotation of the upper idler gears 94 drives the sun gear 98 to rotate in a counter-clockwise direction and thereby also causes the shaft 60 to rotate in a counter-clockwise direction.

F. Nacelle.

Figure 9:
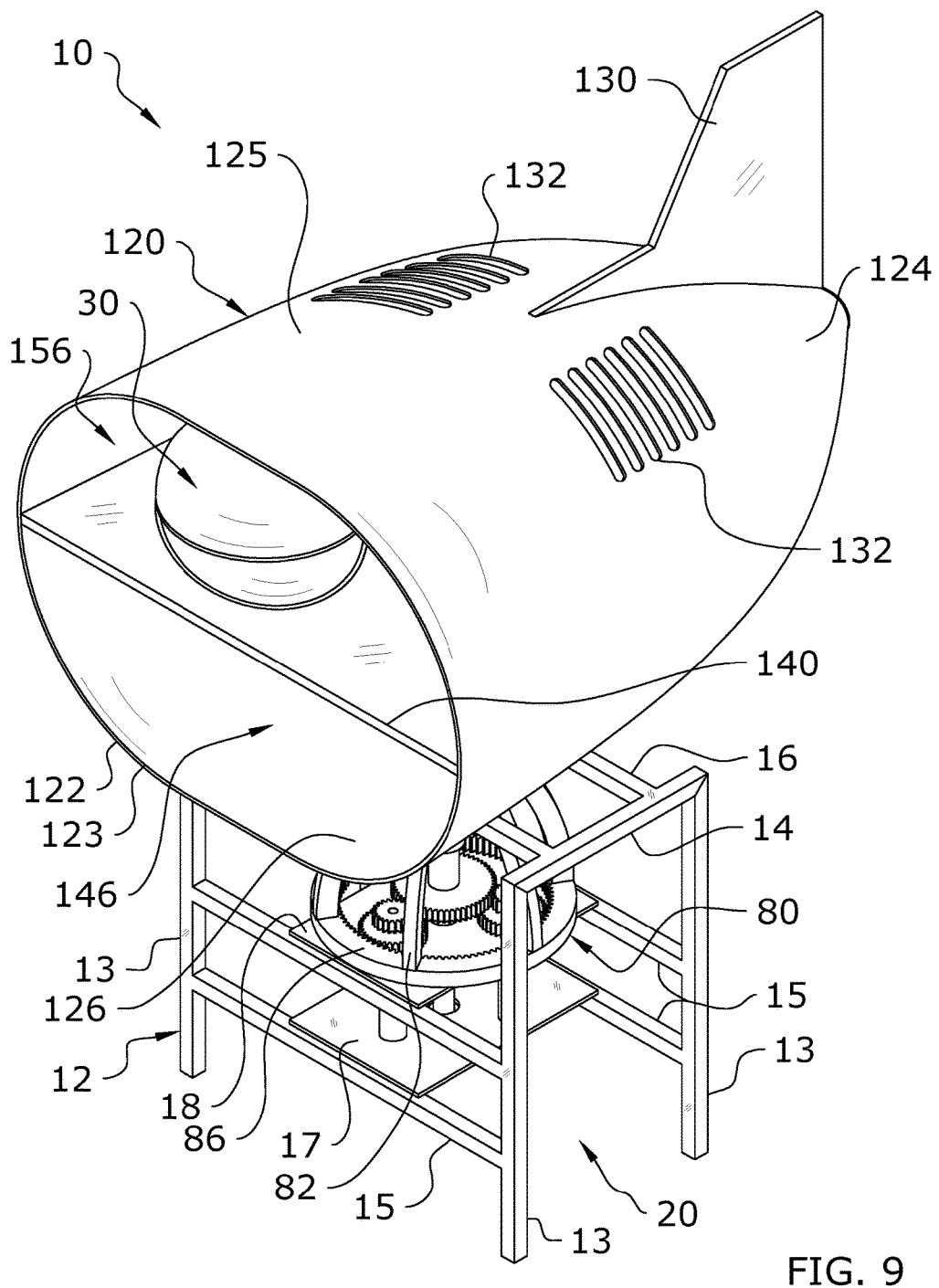
FIG. 9 is an upper perspective view of the wind turbine of FIG. 1 with an attached nacelle.
Figure 10:
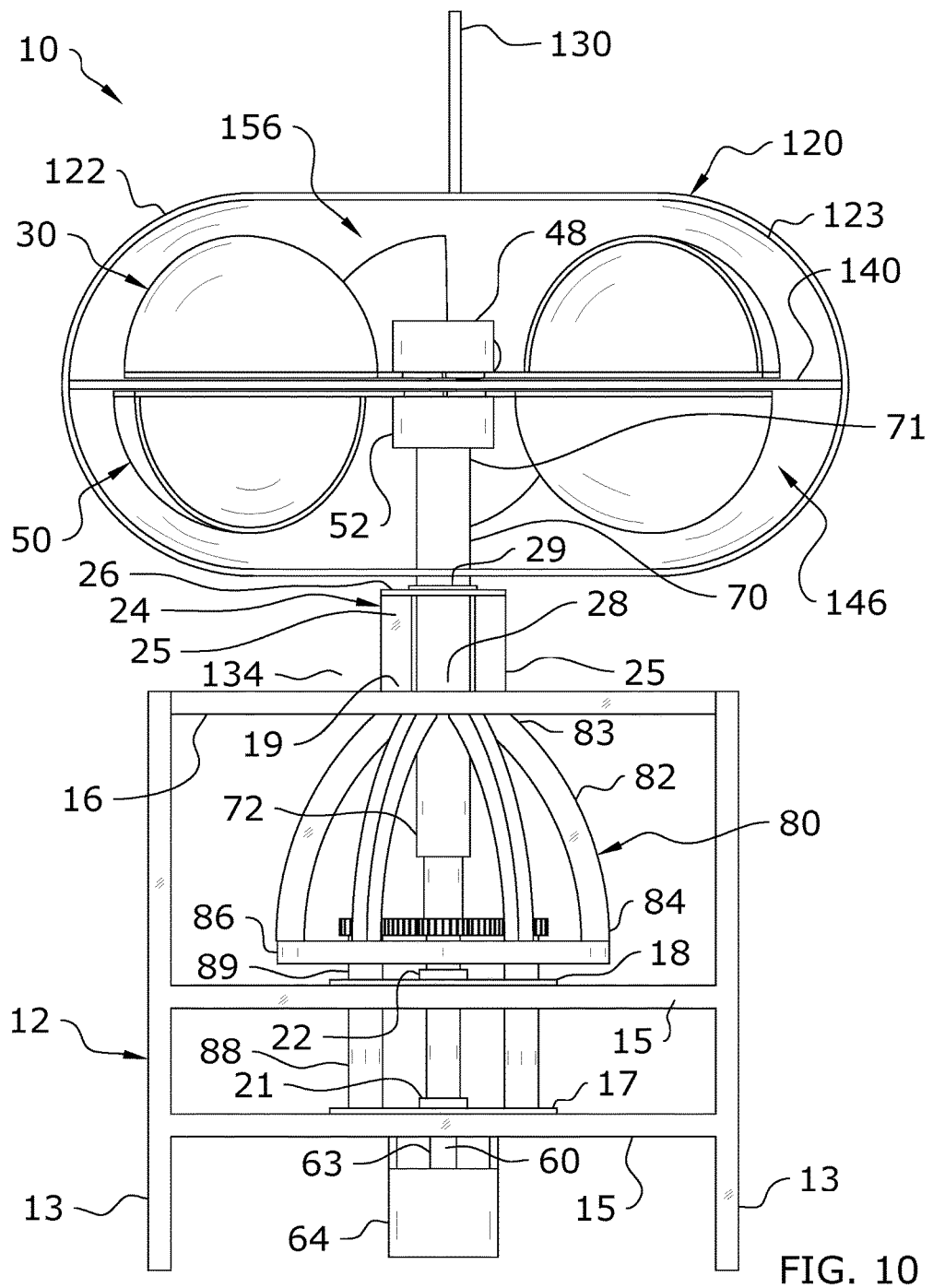
FIG. 10 is a front view of FIG. 9.

Turning to FIGS. 9 and 10, the nacelle 120 is shown surrounding the upper rotor assembly 30 and lower rotor assembly 50. The nacelle 120 has a front end 122, an opening 123, a back end 124, an outer surface 125 and an inner surface 126. A dividing plate 140 is mounted within nacelle 120. The nacelle 120 encloses a lower chamber 146 and an upper chamber 156 that are separated by dividing plate 140. The upper rotor assembly 30 is located in upper chamber 156 and lower rotor assembly 50 is located in lower chamber 146. The nacelle 120 has a tail fin 130 that is mounted to the back end 124. The nacelle 120 is rotatably coupled to the frame 12 by a support disc 134 such that the nacelle 120 can independently rotate relative to the wind. The nacelle 120 has gill shaped vents 132 located toward back end 124 that allow air to exit from chambers 146 and 156.

Wind blowing over the nacelle 120 and tail fin 130 causes the tail fin 130 to orient the nacelle 120 about the support disc 134 such that the opening 123 faces into the direction of the wind.

Figure 12:
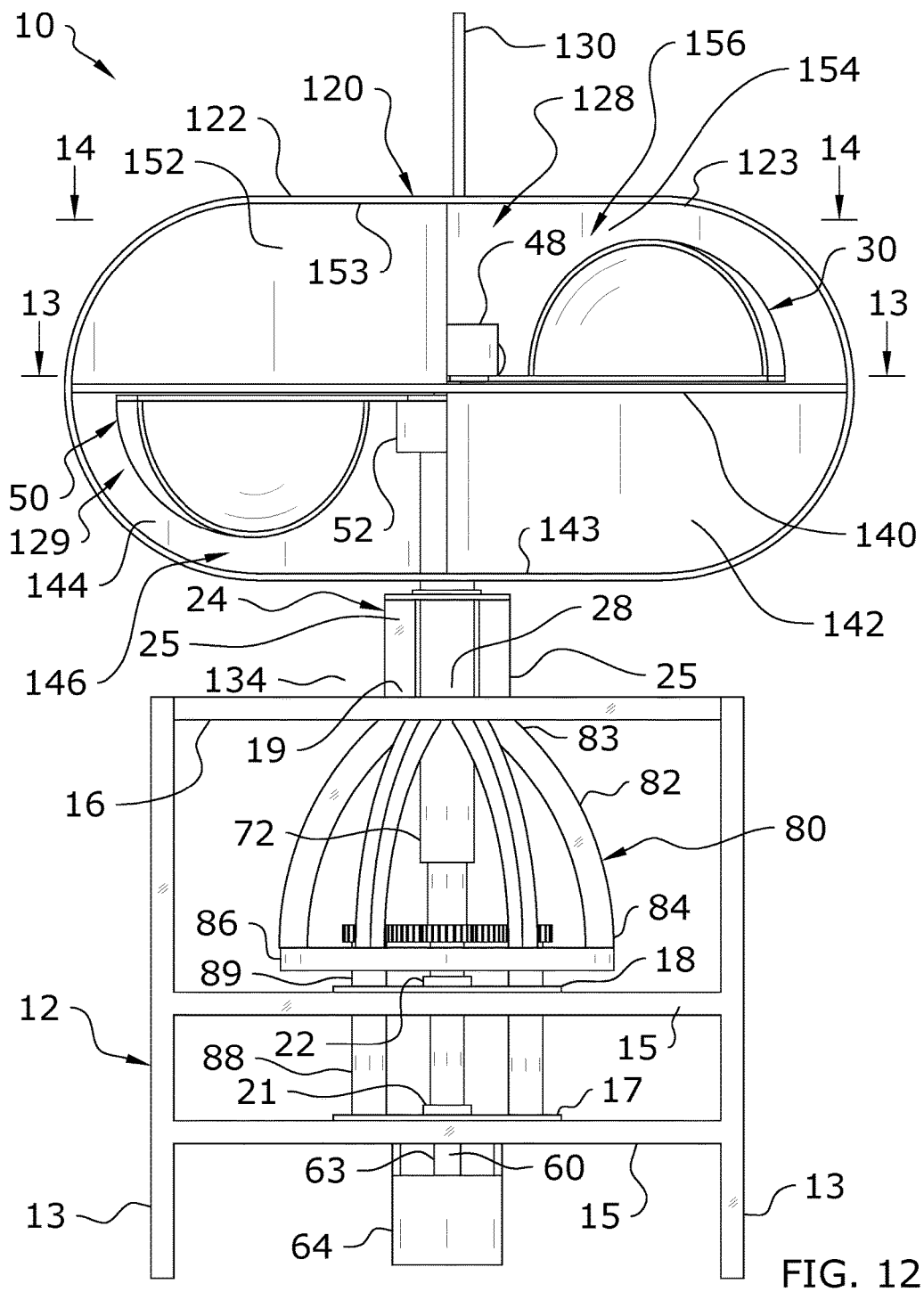
FIG. 12 is a front view of the wind turbine of FIG. 9 with internal air-channeling baffles inside the nacelle.
Figure 13:
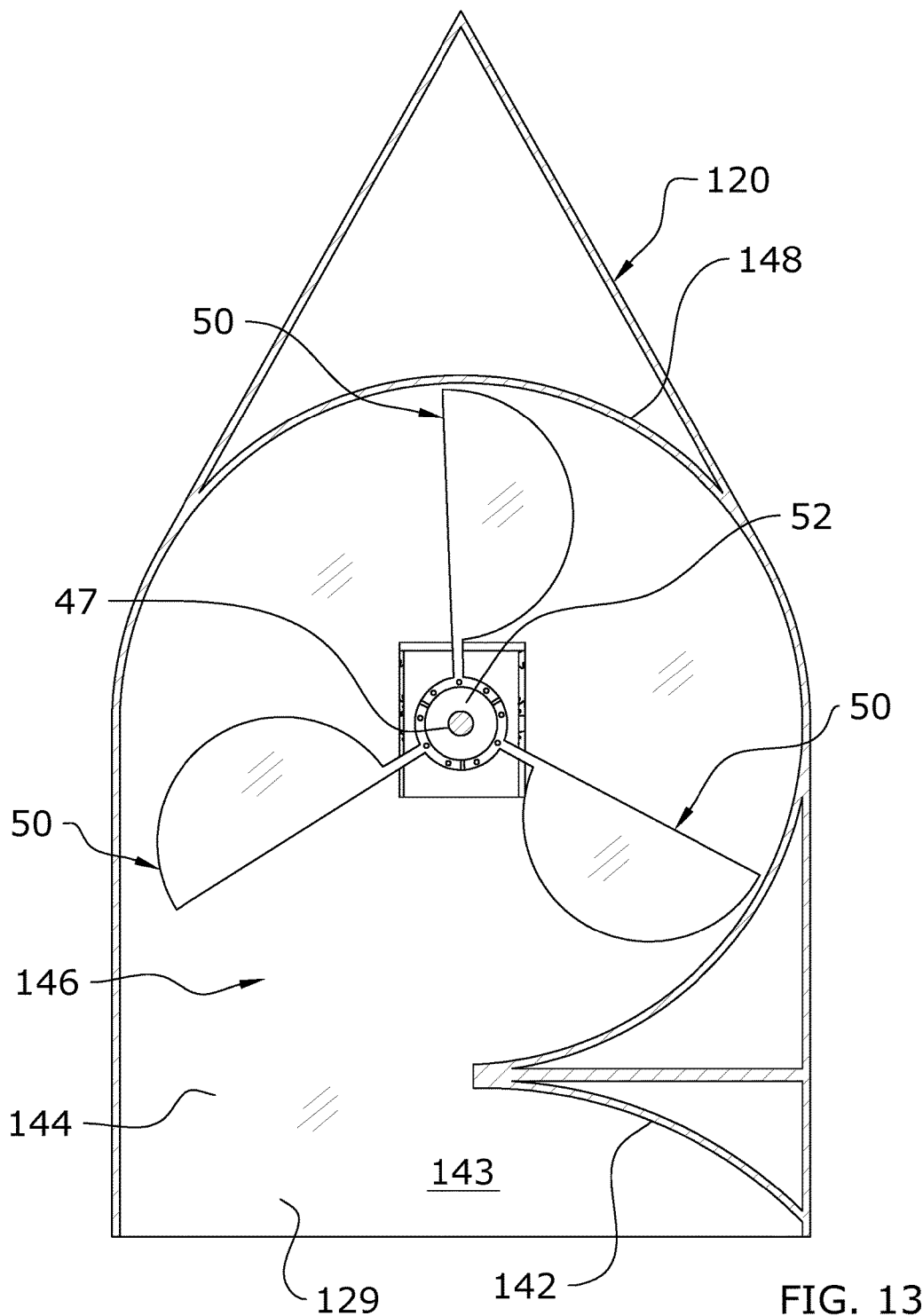
FIG. 13 is a cross-sectional view of the wind turbine of FIG. 12 taken along section line 13-13 showing details of the lower chamber and lower rotor assembly.
Figure 14:
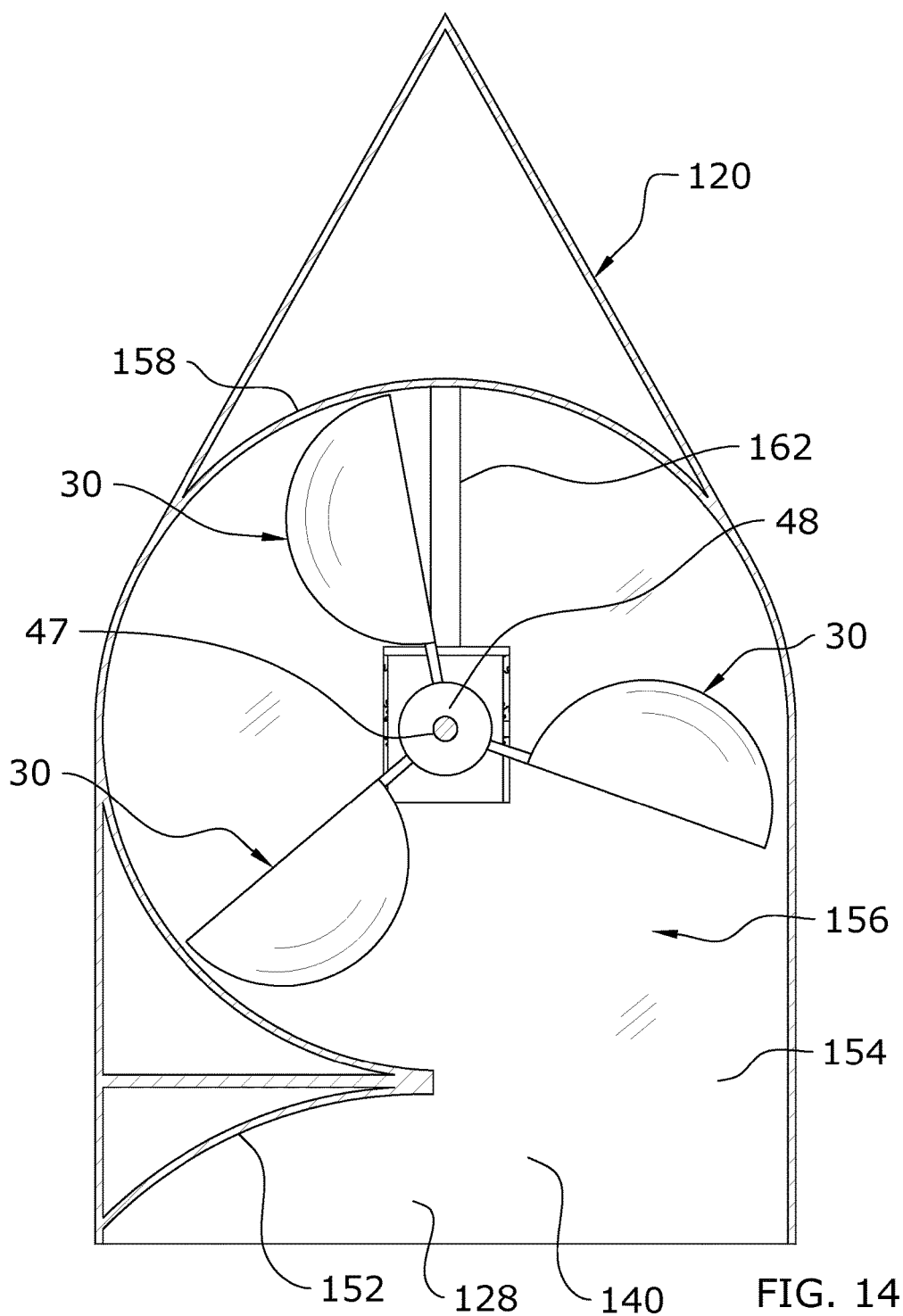
FIG. 14 is a cross-sectional view of the wind turbine of FIG. 12 taken along section line 14-14 showing details of the upper chamber and upper rotor assembly.

Turning to FIGS. 12-14, additional details of wind turbine system 10 will now be described. Nacelle 120 further includes a divider plate 140 that divides nacelle 120 into a lower chamber 146 and an upper chamber 156. Lower chamber 146 has a lower opening 144 that forms a lower intake 129. Upper chamber 156 has an upper opening 154 that forms an upper intake 128. A lower wall or baffle 142 is mounted in lower chamber 146. Lower wall or baffle 142 extends inwardly from one side of nacelle 120 and also extends between a bottom surface 143 of nacelle 120 and divider plate 140. Lower rotor assembly 50 is located in lower chamber 146. A lower shroud 148 partially surrounds lower rotor assembly 50. Lower shroud 148 extends between bottom surface 143 of nacelle 120 and divider plate 140. Lower chamber 146 is defined by bottom surface 143, divider plate 140 and lower shroud 148. Lower rotor assembly 50 rotates within lower chamber 146. In one embodiment, opening 123 of nacelle 120 can be covered with a metal mesh to prevent birds from entering.

Upper chamber 156 has an upper opening 154 that forms an upper intake 128. An upper wall or baffle 152 is mounted in upper chamber 156. Upper wall or baffle 152 extends inwardly from one side of nacelle 120 and also extends between an upper surface 153 of nacelle 120 and divider plate 140. Upper rotor assembly 30 is located in upper chamber 156. An upper shroud 158 partially surrounds upper rotor assembly 30. Upper shroud 158 extends between bottom surface 153 of nacelle 120 and divider plate 140. Upper chamber 156 is defined by top surface 153, divider plate 140 and upper shroud 158. Upper rotor assembly 30 rotates within upper chamber 156. Divider plate 140 has an opening or vent 162 that is located toward the rear of the divider plate. Vent 162 extends through divider plate 140 and extends from upper shroud 158 towards hub 48. Vent 162 allows air to pass between lower chamber 146 and upper chamber 156. The rigid-sail assembly 30 is in a fixed-position orientation with rigid-sail assembly 50 such that the higher-pressure air from the convex surface of the rigid-sail assembly 30 will be pushed through vent 162 to add further kinetic energy to concave surface of the rigid-sail assembly 50. Similarly, the higher-pressure air from the convex surface of the rigid-sail assembly 50 will be pushed through vent 162 to add further kinetic energy to the concave surface of rigid-sail assembly 30. Excess semi-compressed air will be allowed to egress nacelle 120 via a series of gill-shaped openings or vents 132 located toward back end 124.

F. Operation of Preferred Embodiment.

Referring to FIGS. 1-14, the operation of wind turbine system 10 will now be described. The wind turbine system 10 is mounted in an area with sufficient wind speeds to allow the wind turbine system 10 to generate electricity. In one embodiment, the frame 12 can be attached to a ground structure. In another embodiment, the frame 12 can be attached to a building such as the roof of a house.

In another embodiment, the wind turbine system 10 can be placed near a source of moving water. A stream of water can be directed via pipes to impinge on the rotor assemblies 30 and 50 to thereby generate electricity via electrical generator 64.

In operation, wind impinges on the upper rotor assembly 30 and lower rotor assembly 50. Because of the curvature of the rigid sail assembly 40, the rigid sail assembly 40 experiences less drag when moving against the wind than when moving with the wind. Air moving over the outer surface 43 of the rigid sail 41 causes less drag than when air moves into the cavity 45. This differential drag causes the upper rotor assembly 30 and lower rotor assembly 50 to spin. The upper rotor assembly 30 rotates in a counter-clockwise direction when wind impinges upon the upper rigid sail assembly 40. The lower rotor assembly 50 rotates in a clockwise direction when wind impinges upon the lower rigid sail assembly 40.

Because the upper rotor assembly 30 is connected to the upper hub 48 which is connected to the shaft 60, the rotation of the upper rotor assembly 30 drives the shaft 60 to rotate in a counter-clockwise direction. The lower rotor assembly 50 is connected to the lower hub 52 which is connected to the tube 70. The tube 70 is connected to connecting bars 82 which are connected to the ring gear 86. The tube 70 is coupled to the shaft 60 through the ring and idler gear assembly 80.

The rotation of the tube 70 in a clockwise direction causes the ring gear 86 to rotate in a clockwise direction. The clockwise rotation of the ring gear 86 drives the lower idler gears 92 and the attached upper idler gears 94 to rotate in a clockwise direction. The lower and upper idler gears rotate about the pins 90 that are mounted to the posts 88. The clockwise rotation of the upper idler gears 94 drives the sun gear 98 to rotate in a counter-clockwise direction and thereby also causes the shaft 60 to rotate in a counter-clockwise direction.

The rotational forces of the opposite rotating upper rotor assembly 30 and lower rotor assembly 50 are combined by the ring and idler gear assembly 80 to drive the shaft 60 to rotate in a counter-clockwise direction. The shaft 60 is connected to the electrical generator 64. The electrical generator 64 is thereby driven by the combined forces generated by the upper rotor assembly 30 and lower rotor assembly 50. The use of the counter-rotating upper rotor assembly 30 and lower rotor assembly 50 allows for higher power outputs to be generated in a wind turbine system 10 that has a compact overall size.

The nacelle 120 increases the efficiency of the wind turbine system 10. Wind blowing over the nacelle 120 and tail fin 130 causes the tail fin 130 to rotate the nacelle 120 about the support disc 134 such that the opening 123 faces into the direction of the wind. Air entering the upper air intake 128 is directed by upper baffle 152 towards upper opening 154 and impinges on the upper rotor assembly 30 causing the upper rotor assembly 30 to rotate in a counter-clockwise direction. Air entering the lower air intake 129 is directed by lower baffle 142 towards lower opening 144 and impinges on the lower rotor assembly 50 causing the lower rotor assembly 50 to rotate in a clockwise direction.

During the rotation of lower rotor assembly 50, rigid sail assembly 40 will pass under vent 162. As rigid sail assembly 40 passes under vent 162, air pressure from lower chamber 146 is exhausted into upper chamber 156 increasing the air pressure on rigid sail assembly 40 of upper rotor assembly 30 assisting in the counter-clockwise rotation of upper rotor assembly 30. During the rotation of upper rotor assembly 30, rigid sail assembly 40 will pass over vent 162. As rigid sail assembly 40 passes over vent 162, air pressure from upper chamber 156 is exhausted into lower chamber 146 increasing the air pressure on rigid sail assembly 40 of lower rotor assembly 50 assisting in the clockwise rotation of lower rotor assembly 50. The angular orientation and position of rotors 32, rigid sail assembly 40 and vent 162 allows air passing through vent 162 to assist in the rotation of both the upper rotor assembly 30 and the lower rotor assembly 50.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A wind turbine system comprising:
   a frame;
   a shaft supported by the frame;
   a tube surrounding the shaft;
   a gear assembly coupled to the shaft;
   a first rotor assembly coupled to the shaft, the first rotor assembly configured to rotate in a first direction and thereby to rotate the shaft in the first direction; and
   a second rotor assembly coupled to the gear assembly, the second rotor assembly configured to rotate in a second direction and thereby to rotate the shaft in the first direction via the gear assembly;
   wherein the gear assembly is a ring and idler gear assembly comprising:
      a sun gear connected to the rotatable shaft;
      a plurality of idler gears engaged with the sun gear; and
      a ring gear connected to the tube, wherein the ring gear is engaged with the idler gears, wherein rotation of the ring gear in the second direction drives the idler gears to rotate in the second direction and rotation of the idler gears in the second direction drives the sun gear to rotate in the first direction.

2. The wind turbine system of claim 1, including a plurality of connecting bars each having a first end and a second end, the first end of the connecting bars is connected to the ring gear and the second end of the connecting bars is connected to the tube surrounding the shaft.

3. The wind turbine system of claim 1, wherein the first rotor assembly further comprises:
   a plurality of first arms having a first end and a second end, the first end of the first arms is coupled to the shaft; and
   a first rigid sail assembly connected to the second end of each of the first arms.

4. The wind turbine system of claim 3, wherein the second rotor assembly further comprises:
   a plurality of second arms having a first end and a second end, wherein the first end of the second arms is connected to the tube; and
   a second rigid sail assembly connected to the second end of each of the second arms.

5. The wind turbine system of claim 1, wherein the second rotor assembly further comprises:
   a plurality of second arms having a first end and a second end, wherein the first end of the second arms is connected to the tube; and
   a second rigid sail assembly connected to the second end of each of the second arms.

6. The wind turbine system of claim 1, wherein the shaft has a first end and a second end, the first rotor assembly is connected to the first end and an electrical generator is connected to the second end.

7. The wind turbine system of claim 1, wherein the first rotor direction is opposite the second rotor direction.

8. The wind turbine system of claim 1, wherein the shaft is supported by the frame by a first set of bearings attached to the frame and the tube is supported by the frame by a second set of bearings attached to the frame.

9. The wind turbine system of claim 1, wherein the first rotor assembly and the second rotor assembly are at least partially surrounded by a nacelle rotatably coupled to the frame.

10. The wind turbine system of claim 9, wherein the nacelle has a tail portion and at least one exhaust vent.

11. The wind turbine system of claim 9, wherein the nacelle is comprised of a front end having a front opening and a back end opposite of the front end.

12. The wind turbine system of claim 11, wherein the nacelle includes a dividing plate that divides an interior of the nacelle into an upper chamber and a lower chamber, wherein the a first rotor assembly is positioned within the upper chamber and the second rotor assembly is positioned within the lower chamber.

13. The wind turbine system of claim 12, including a tail fin attached to the back end of the nacelle.

14. The wind turbine system of claim 12, including an exhaust vent within the nacelle.

15. The wind turbine system of claim 12, wherein the upper chamber includes an upper intake opening and the lower chamber includes a lower intake opening.

16. The wind turbine system of claim 12, including a vent opening extending through a rear portion of the divider plate fluidly connecting the upper chamber and the lower chamber, wherein the vent opening within the divider plate is configured to allow air to pass between the lower chamber and the upper chamber.

17. A wind turbine system comprising:
   a frame;
   a shaft supported by the frame;
   a tube surrounding the shaft;
   a gear assembly coupled to the shaft;
   a first rotor assembly coupled to the shaft, the first rotor assembly configured to rotate in a first direction and thereby to rotate the shaft in the first direction;
   a second rotor assembly coupled to the gear assembly, the second rotor assembly configured to rotate in a second direction and thereby to rotate the shaft in the first direction via the gear assembly, wherein the first rotor direction is opposite the second rotor direction;
   a plurality of first arms having a first end and a second end, the first end of the first arms is coupled to the shaft;
   a first rigid sail assembly connected to the second end of each of the first arms;

a plurality of second arms having a first end and a second end, wherein the first end of the second arms is connected to the tube;

a second rigid sail assembly connected to the second end of each of the second arms; and a nacelle rotatably coupled to the frame, wherein the first rotor assembly and the second rotor assembly are at least partially surrounded by the nacelle;

wherein the nacelle includes a front end having a front opening and a back end opposite of the front end;

wherein the nacelle includes a dividing plate that divides an interior of the nacelle into an upper chamber and a lower chamber, wherein the a first rotor assembly is positioned within the upper chamber and the second rotor assembly is positioned within the lower chamber;

wherein the nacelle includes an exhaust vent;

wherein the upper chamber includes an upper intake opening and the lower chamber includes a lower intake opening.

18. The wind turbine system of claim 17, including a vent opening extending through a rear portion of the divider plate fluidly connecting the upper chamber and the lower chamber, wherein the vent opening within the divider plate is configured to allow air to pass between the lower chamber and the upper chamber.

* * * * *